United States Patent [19]
Monus

[11] Patent Number: 5,109,796
[45] Date of Patent: May 5, 1992

[54] FISH HABITAT STRUCTURE

[75] Inventor: Donald T. Monus, Largo, Fla.

[73] Assignee: Alfred R. Priest, Belleair, Fla.

[21] Appl. No.: 731,544

[22] Filed: Jul. 17, 1991

[51] Int. Cl.$^5$ .............................................. A01K 61/00
[52] U.S. Cl. ........................................................ 119/3
[58] Field of Search ................... 119/2, 3, 4; 405/25, 405/34, 35

[56] References Cited

U.S. PATENT DOCUMENTS

| | | | |
|---|---|---|---|
| 3,028,611 | 4/1962 | Scaccia, Jr. | 119/3 |
| 3,294,061 | 12/1966 | Hanks | 119/4 |
| 3,316,881 | 5/1967 | Fischer | 119/4 |
| 3,898,958 | 8/1975 | Pranis, Jr. | 119/3 |
| 4,266,509 | 5/1981 | Gollott et al. | 119/2 |
| 4,334,499 | 6/1982 | Baass | 119/2 |
| 4,465,399 | 8/1984 | Kikuzawa et al. | 405/25 X |
| 4,736,708 | 4/1988 | Yoder | 119/2 |
| 4,913,094 | 4/1990 | Jones et al. | 119/3 |
| 4,947,791 | 8/1990 | Laier et al. | 119/3 |
| 4,993,362 | 2/1991 | Jimbo | 119/3 |
| 5,038,715 | 8/1991 | Fahs, II | 119/3 |

FOREIGN PATENT DOCUMENTS

| | | | |
|---|---|---|---|
| 2586895 | 3/1987 | France | 119/3 |
| 2613184 | 10/1988 | France | 119/2 |

Primary Examiner—John G. Weiss
Assistant Examiner—Nicholas D. Lucchesi
Attorney, Agent, or Firm—Herbert W. Larson

[57] ABSTRACT

Multiple layers of plastic pipe are attached together. Each layer has multiple parallel pipes of similar diameter, and each layer is attached at a right angle to each adjacent layer. The lowest layer of pipes has an interior diameter larger than the interior diameter of the next upper layer. Each succeeding upper layer has an inside pipe diameter less than the diameter of the next lowest layer.

8 Claims, 2 Drawing Sheets

FISH HABITAT STRUCTURE

BACKGROUND OF THE INVENTION

1. Field of the Invention

This invention relates to fish habitat structures. More particularly, it refers to a multiplicity of plastic pipes of differing diameters structurally engaged to provide a habitat for small fish.

2. Description of the Prior Art

Many different apparatus and structures have been suggested in the prior art for fish habitats. These include U.S. Pat. No(s). 4,266,509; 4,334,499; 4,736,708; 4,913,094; 4,947,791; and 4,993,362. Although all the structures described provide fish or shellfish habitats, they do not specifically provide habitats for various sizes of small fish that inhabit estuaries and lake bottoms. An improved fish habitat for use in estuaries is needed.

SUMMARY OF THE INVENTION

I have invented an improved fish habitat structure that can be used to protect small fish in areas where their natural habitat has been removed or destroyed by human construction activities.

My fish habitat structure is constructed with multiple layers of parallel plastic pipe more than fourteen inches in length. Each layer of plastic pipe is positioned at a right angle to a next lower or upper layer. The lowest layer has the largest diameter opening, and each higher level has pipe of diminishing diameter openings. The lowest layer is embedded in an estuary or lake bottom. Each layer of pipe is bolted or glued to the adjacent layers, and an elastomeric spacer maintains a spaced relationship between the pipe layers.

BRIEF DESCRIPTION OF THE DRAWINGS he invention may be best understood by those having ordinary skill in the art by reference to the following detailed description when considered in conjunction with the accompanying drawings in which.

DETAILED DESCRIPTION OF THE INVENTION

Figure 1:
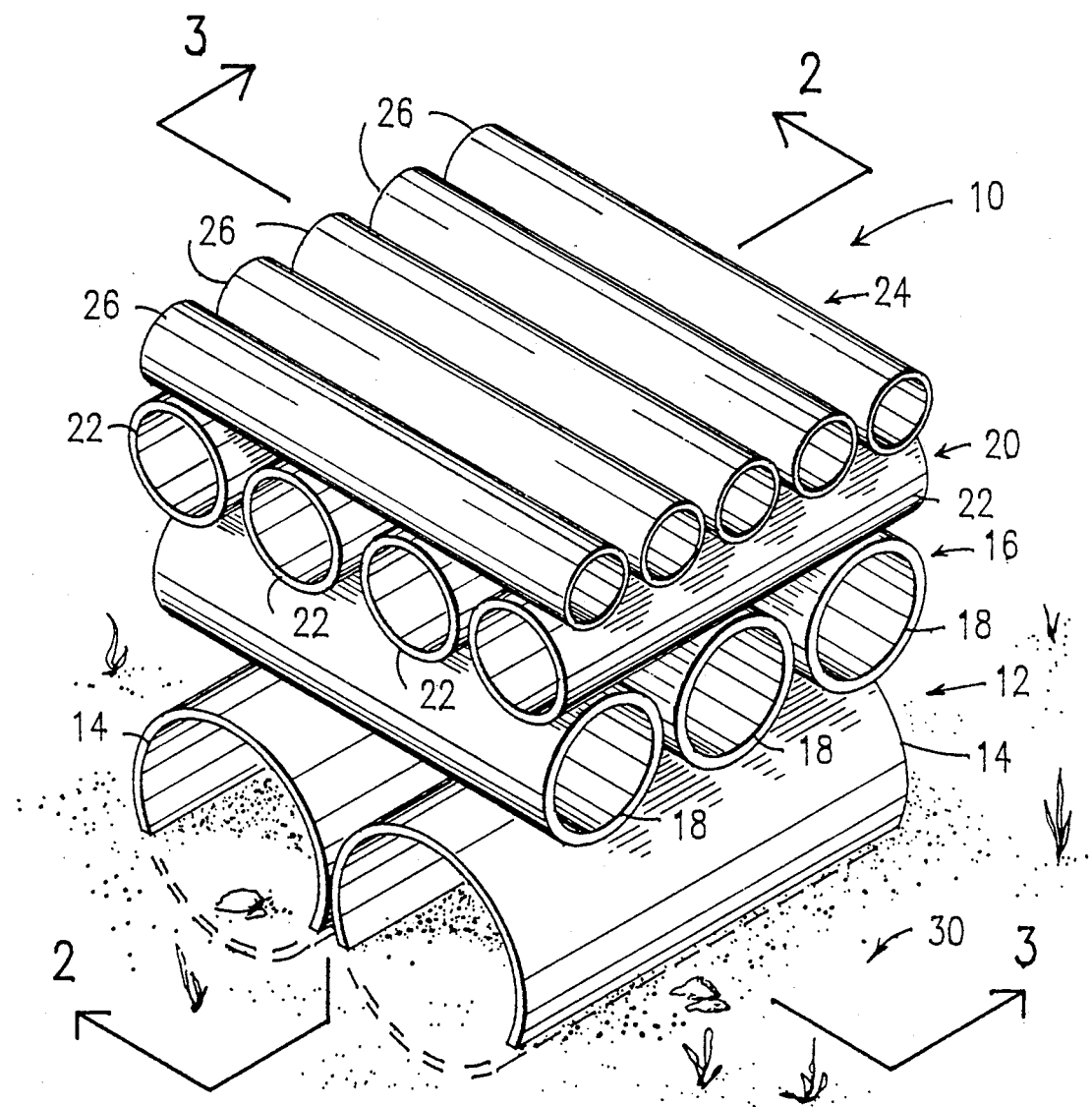
FIG. 1 is an isometric view of a fish habitat structure according to the invention.

Throughout the following detailed description, the same reference numerals refer to the same elements in all figures.

The fish habitat structure 10 shown in FIG. 1 is generally configured by a multiplicity of polyvinyl chloride pipe arranged in layers, with each layer at right angles to an adjacent upper or lower layer. The first layer 12 has a least two parallel, six-inch diameter polyvinyl chloride pipes 14. This first layer is embedded in or on the bottom 30 of an estuary or lake bed. The second layer 16 has at least three parallel four-inch diameter polyvinyl chloride pipes 18 at right angles to the first layer 12. The third layer 20 has at least four parallel three-inch diameter polyvinyl chloride pipes 22 at right angles to the second layer 16. The fourth layer 24 has at least five parallel two-inch diameter polyvinyl chloride pipes 26 at right angles to the third layer 20. All the pipes should be at least fourteen inches in length and can extend as long as desired.

Figure 2:
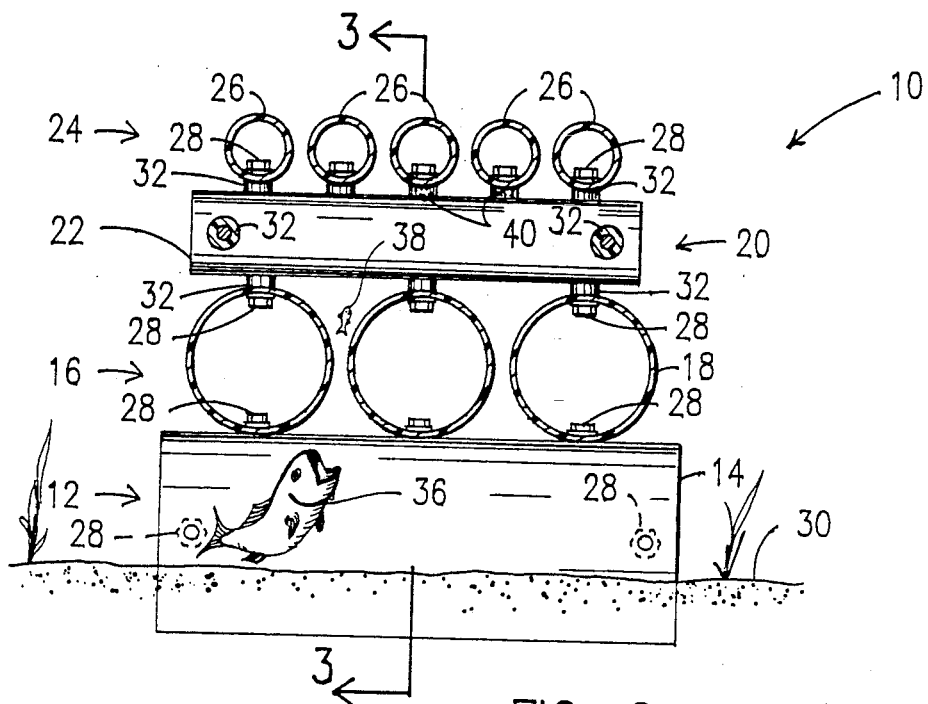
FIG. 2 is a cross sectional elevational view along lines 2—2 of FIGS. 1 or 3.
Figures 3, 4:
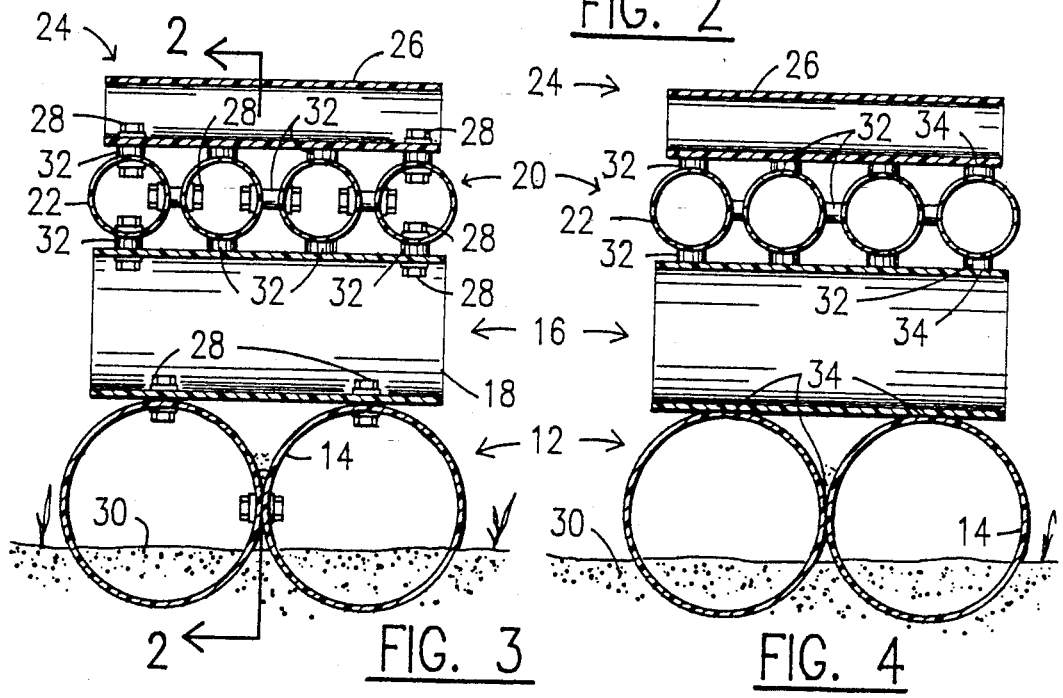
FIG. 3 is a cross sectional elevational view along lines 3—3 of FIGS. 1 or 2.
FIG. 4 is a cross sectional elevational view of a fish habitat structure with pipes attached together by water impermeable glue.

As shown in FIGS. 2 and 3, the adjacent pipes can be bolted together, using non-corrosive bolts 28, with an elastomeric spacer 32 maintaining the second layer 16 spaced apart from the third layer 20, and the third layer 20 spaced apart from the fourth layer 24. Optionally, elastomeric spacer 32 can be inserted between adjacent pipes 22 and either bolted with non-corrosive material such as stainless steel, plastic, brass nuts and bolts or glued in place.

As shown in FIG. 4, the pipes optionally can be glued 34 together or electron beam welded together.

Although large fish 36, as shown in FIG. 2, can move around the fish habitat structure, they cannot catch small fry 38 or eat fish eggs 40 deposited within the fish habitat structure 10. The fish habitat structure 10 provides a habitat for small fish during a crucial, vulnerable time in their development and is, therefore, useful in estuaries or on lake bottoms 30, where large concentrations of small fish are found. These fish habitat structures can be used in areas where fish releases are made or where sea walls have been constructed and mangrove and sea grass, which previously provided protection for small fish have been destroyed. By employing the habitat structure, time can be provided to allow damaged ecological environments to be restored naturally at comparatively low cost. Predators such as larger fish, crustaceans, mollusks or birds are not able to easily devour the small fish protected by the structure.

Additional layers of pipes, or additional pipes per layer, can be employed if a larger structure is needed.

Having thus described the invention, what is claimed and desired to be secured by Letters Patent is:

1. A fish habitat structure for use in estuaries and lake bottoms comprising multiple layers of plastic pipes attached together, with each layer positioned at a right angle to an adjacent layer, each layer of pipes containing multiple parallel pipes spaced apart from adjacent pipes, a first bottom layer of pipes having an interior diameter larger than the interior diameter of the pipes of a next upper layer, and succeeding upper layers of pipes, with the pipes of each succeeding upper layer having an interior diameter less than the pipe diameter in a layer below, and the bottom layer of pipes adapted to be embedded in the estuary or lake bottom.

2. A fish habitat structure according to claim 1 wherein the first layer has a pipe inside diameter of about six inches and each upper layer has a pipe diameter about one to two inches less than the pipe diameter of an adjacent lower layer of pipes.

3. A fish habitat structure according to claim 2 wherein there are at least four layers of pipes 4. A fish habitat structure according to claim 3 wherein each layer of pipes is bolted to an adjacent layer of pipes.

5. A fish habitat structure according to claim 4 wherein an elastomeric spacer is bolted between each layer of pipes.

6. A fish habitat structure according to claim 3 wherein each layer of pipes is glued to an adjacent layer of pipes.

7. A fish habitat structure according to claim 1 wherein each layer of pipes and each parallel pipe in each layer is spaced apart from an adjacent pipe.

8. A fish habitat structure according to claim 1 wherein each layer of pipes is spaced apart from an adjacent layer by an elastomeric spacer.

* * * * *